UNITED STATES PATENT OFFICE.

WILLIAM HENRY PORTER, OF NEW YORK, N. Y., ASSIGNOR TO THE AIR LIGHTER COMPANY, OF SAME PLACE.

CATALYTIC MATERIAL, &c.

SPECIFICATION forming part of Letters Patent No. 612,614, dated October 18, 1898.

Application filed April 26, 1895. Renewed February 15, 1898. Serial No. 670,433. (No specimens.)

*To all whom it may concern:*

Be it known that I, WILLIAM HENRY PORTER, a citizen of the United States, residing in the city, county, and State of New York, have invented certain new and useful Improvements in Catalytic Materials and the Preparation Thereof, of which the following is a specification.

This invention relates to the preparation of catalytic agents or compositions of matter of such a kind as will glow when simultaneously brought in contact with air and illuminating-gas and also cause ignition of such gas and which will retain this property indefinitely, so that they may be used many thousand times without injury or deterioration.

The object of the invention is to produce a catalytic agent or composition of matter which will of itself when brought in contact with air and illuminating-gas, without the aid of any extraneous heat, develop heat to any degree from a dull-red heat to incandescence and to inflame combustible gases or vapors, the composition being practically incombustible and infusible and capable of long and continued use for the purposes designed.

To these ends the invention consists of a new agent or composition of matter having extremely active catalytic qualities and composed of two or more ingredients, as well as in the improvement in the art of making such agent, and with this general statement in regard to the invention the method of carrying out the same will now be explained in detail, so as to enable those skilled in the art to make and use the same.

It has long been known that platinum and some other so-called "catalytic" metals have the power of causing ignition of hydrogen in oxygen or in air at ordinary temperatures.

My new catalytic agents possess the property not only of igniting illuminating-gas and other combustible gases at ordinary temperatures and even much below zero Fahrenheit, but they will also cause ignition of combustible vapors—such as those of alcohol, ether, and others—at ordinary temperatures and will retain this property practically indefinitely without suffering any substantial alteration or deterioration. This desirable result is accomplished by mixing a catalytic metal in a finely-divided state with a metallic oxid which is substantially infusible at a white heat and also unalterable in the air at ordinary temperatures, as will now be explained.

Platinic chlorid (PtCl$_4$) and hydrated aluminium chlorid (AlCl$_3$) are dissolved in water in the proportion of, for instance, one part platinic chlorid to eight parts hydrated aluminium chlorid. Combustible material—such as loose or woven cotton or linen, woodpulp, wood, or paper, &c.—is saturated with the solution and the volatile and combustible ingredients eliminated and a mixture of finely-divided platinum and aluminium oxid of extreme porosity will be produced, which is very rapid in its action as a catalytic agent. The combustible material previous to being eliminated by burning or otherwise serves as a base or support for the catalytic agent as fast as formed and imparts a fibrous structure to the residue of finely-divided platinum and aluminium oxid. By heating, the mixture of platinum chlorid and aluminium chlorid and water decomposes into metallic platinum in a finely-divided state and aluminium oxid in a porous state, the excess of hydrochloric acid, chlorin, and water being expelled. The reaction involved may be indicated by the following equation:

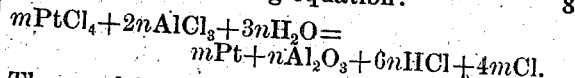

$$mPtCl_4 + 2nAlCl_3 + 3nH_2O = mPt + nAl_2O_3 + 6nHCl + 4mCl.$$

The resulting solid material or composition (indicated in the equation by $mPt + nAl_2O_3$) represents an intimate mixture of finely-divided platinum and aluminium oxid. The combustible matter present causes the platinic chlorid to be decomposed at a comparatively low temperature, whereby the platinum produced assumes a state of exceedingly-fine subdivision or the form of platinum-black, and the mixture is a catalytic agent very rapid in its action, as before stated. The oxid present prevents the small particles of metal from coalescing or assuming a reguline shape.

The solution may be applied in a thinly fluid state or in a more or less concentrated or pasty shape.

In place of platinic chlorid platinous chlorid may of course be used, or a mixture of these, and instead of the chlorids of platinum and aluminium equivalent salts may be used, such as sulfates and acetates, the proportions being selected, so that for each part of metallic platinum contained there will be from two to six parts of metallic aluminium. These proportions are given as being within operative limits, although the invention is not confined thereto, as any proportions capable of effecting the desired result are evidently within the scope of the invention. It is also evident that the platinum heretofore described may be replaced in whole or in part by any of its equivalents, as other "catalytic" metals, so called—such as palladium, iridium, and the salts thereof—by which the desired results may be more or less perfectly attained without departing from the spirit of the invention. So, also, in place of an aluminium-salt a suitable salt of any other metal of the earth group, such as zirconium and cerium, as well as metals approximating in the properties to these, such as magnesium, may be used and are of course also included within the scope of the invention.

What I claim is—

1. A catalytic agent or composition of matter, comprising a mixture of catalytic metal, and a substantially infusible metallic oxid and having the property of causing ignition of ordinary illuminating-gas at ordinary temperatures, substantially as described.

2. A catalytic agent or composition of matter, consisting of an intimate mixture of finely-divided platinum and aluminium oxid, and having the property of causing ignition of ordinary illuminating-gas at ordinary temperatures, substantially as set forth.

3. A catalytic agent or composition of matter in a fibrous shape, consisting of finely-divided catalytic metal and a substantially infusible metallic oxid, substantially as described.

4. A catalytic agent or composition of matter in a fibrous shape, consisting of finely-divided platinum and aluminium oxid, substantially as described.

5. A catalytic gas-lighter comprising a mixture of catalytic metal and a substantially infusible metallic oxid, and a support therefor, substantially as described.

6. A catalytic gas-lighter comprising a mixture of catalytic metal and aluminium oxid, and a support therefor, substantially as set forth.

7. A catalytic gas-lighter, comprising an intimate mixture of finely-divided platinum and aluminium oxid, and a support therefor, substantially as described.

8. In the art of preparing catalytic agents or compositions of matter, the improvement which consists in heating a solution of chlorid or chlorids of catalytic metal or metals and metallic chlorid or chlorids convertible by heating into substantially infusible oxid or oxids until a mixture is obtained consisting of finely-divided catalytic metal or metals and infusible metallic oxid or oxids, substantially as and for the purposes set forth.

9. In the art of preparing catalytic agents or compositions of matter, the improvement which consists in impregnating a combustible matter with a solution of catalytic metal or metals and metallic salt or salts convertible by heating into substantially infusible oxid or oxids, heating the material until the combustible matter is consumed, and a residue obtained consisting of a porous mixture of catalytic metal or metals and infusible metallic oxid or oxids, substantially as and for the purposes set forth.

In testimony whereof I have signed my name to this specification in the presence of two subscribing witnesses.

WILLIAM HENRY PORTER.

Witnesses:
C. F. MEEK,
O. MUSSINAN.